United States Patent Office
3,810,780
Patented May 14, 1974

3,810,780
CARBONACEOUS COATING FOR CARBON FOAM
Zane L. Ardary, Kingston, and Virgil B. Campbell and Carl D. Reynolds, Oak Ridge, Tenn., assignors to the United States of America as represented by the United States Atomic Energy Commission
No Drawing. Filed Feb. 8, 1972, Ser. No. 224,601
Int. Cl. B44d 1/44; C01b 31/02
U.S. Cl. 117—46 CB
2 Claims

ABSTRACT OF THE DISCLOSURE

An improved carbonaceous coating for carbon foam articles is provided to enhance the structural integrity of the foam and to protect the foam during handling. The coating is provided by applying to exposed surfaces of the carbon foam article a mixture of colloidal graphite and a dissolved thermosetting alkyd resin, drying the coating mixture, and thereafter carbonizing the resin.

---

The present invention relates generally to an improved carbonaceous coating for protecting carbon foam articles and more particularly to a method of providing carbon foam articles with the improved coating. This invention was made in the course of, or under, a contract with the U.S. Atomic Energy Commission.

Cellular or porous bodies formed of carbonized organic materials have been found to be particularly useful in high temperature applications as thermal insulators and in applications where the excellent strength-to-weight ratios of the carbonized cellular bodies may be advantageously employed. These carbonized cellular bodies, commonly and hereinafter referred to as carbon foams, are producible in selected densities ranging from a low density of about 0.02 gm./cc. up to a high density of about 1.0 or more gm./cc. so as to be more suitable for the particular envisioned usage.

While carbon foam possesses properties and characteristics which render it particularly useful as strong, lightweight structural material, it also possesses inherently fragile and abradable surfaces which significantly detract from its usefulness in many applications. Carbon foam in the lower densities has sufficiently friable surfaces that abrasion or crumbling of the foam is troublesome and is a fairly common occurrence during handling and assembly of finished carbon foam structures.

Some success has been achieved in providing carbon foam articles with a protective coating which greatly increased the structural integrity of the carbon foam. As set forth in assignee's U.S. Pat. No. 3,558,344 issuing on Jan. 26, 1971, and entitled "Carbonaceous Coating for Carbon Foam," the aforementioned protective coating was provided by applying to surfaces of carbon foam structures a mixture of graphite flour and a thermoplastic resin dissolved in a solvent therefor, drying the mixture, and then carbonizing the resin. While the carbonaceous coating produced by practicing the technique described in assignee's above-noted patent represented a measure of protection for carbon foam articles not previously available, some shortcomings or drawbacks were present which detracted from its usefulness in many applications, particularly where the weight of the carbon foam article is of concern. For example, with a low-density carbon foam article the patented carbonaceous coating added about 12 to 20 grams of weight to the article whereas the improved carbonaceous coating of present invention added only about 4 to 6 grams to a carbon foam article of corresponding density and configuration. Similarly, the patented coating added about 7 to 12 grams to the weight of a higher-density carbon foam article which is considerably greater than the 2 to 4 grams added by the improved carbonaceous coating on a carbon foam article of corresponding density and configuration. Also, while the apparent compressive strength of the carbon foam provided with the patented coating was substantially greater than carbon foam without the coating, considerable care still had to be exercised to prevent damage to the coated carbon foam articles during shipping and handling. Further, the full intercellular strength of the foam was not fully realized due to a yielding surface.

It is the aim or the primary objective of the present invention to substantially minimize the above and other shortcomings or drawbacks by furnishing a carbon foam article with an improved carbonaceous coating which is significantly lighter than the aforementioned patented coating as compared above and yet provides the carbon foam article with sufficient surface toughness that essentially the full inherent carbon foam intercellular strength can be realized. These goals are achieved by practicing the method of the present invention which provides a cellular structure consisting essentially of carbon with an abrasion-resistant protective carbonaceous coating. This method comprises the steps of applying to selected surface portions of the cellular structure a coating mixture of a thermosetting alkyd resin dissolved in a solvent therefor and colloidal graphite, removing excess solvent from the coating mixture, and thereafter heating the coated assembly in an inert atmosphere to a temperature sufficient to carbonize the thermosetting resin and thereby form the protective carbonaceous coating, said coating characterized by its tenacious adherence with the underlying cellular structure and the strengthening of the individual cell walls of the latter exposed at the surface thereof and contacted by the coating mixture.

Other and further objects of the invention will be obvious upon an understanding of the illustrative method about to be described, or will be indicated in the appended claims, and various advantages not referred to herein will occur to one skilled in the art upon employment of the invention in practice.

Generally, the present invention is directed to the formation of an improved carbonaceous coating on selected surface portions of a carbon foam structure or article for the purpose of protecting the coated areas from damage. The method for providing the carbon foam with the carbonaceous coating generally comprises the steps of preparing a coating mixture by blending together a thermosetting alkyd resin dissolved in a suitable solvent and a quantity of colloidal graphite, applying the coating mixture to selected surface portions of a carbon foam article, drying the applied mixture to remove excess solvent therefrom, and then heating the coated carbon foam to a temperature sufficient to carbonize the resin.

The resin employed in the fabrication of the improved carbon foam coating of the present invention is an alkyd resin of the thermosetting type such as polyethylene orthophthalate, polyethylene terephthalate, and polypropylene orthophthalate. The quantity of resin employed in the coating mixture is preferably in the range of about 14 to 22.5 weight percent of the mixture.

Due to the high surface area of the carbon foam a thermoplastic resin would be absorbed into the body of the carbon foam by capillary action during the plastic stage of the resin when undergoing pyrolysis. Migration of the thermoplastic resin can be avoided by use of a high concentration of inert filler such as in the pitch/graphite flour coating described in the aforementioned patent but low strength and adhesion would generally follow.

The coating mixture for the carbon foam includes a quantity of colloidal graphite for filling the openings in the cell walls contiguous with and exposed to the surface of the carbon foam. By using colloidal graphite in the coating mixture, the carbonized coating provided on the carbon foam substrate strengthens the walls of the individual carbon foam cells which, in turn, increases the foam's compressive strength and resistance to abrasion. The use of the dissolved alkyd resin without the colloidal graphite filler would not provide a satisfactory coating since the resin would tend to be absorbed into the foam and would also crack during carbonization without some inert filler. Satisfactory results with minimum weight gain for the coated carbon foam may be achieved by using a quantity of graphite corresponding to about 7.5 to 16.0 weight percent of the coating mixture. The colloidal graphite is in a size range of about 1 to 500 millimicrons. The colloidal particle is superior to larger particles in that a thinner, more uniform, adherent, continuous coating of the walls can be obtained so as to minimize the weight gain of the carbon foam due to the presence of the coating.

In applying the coating mixture to the carbon foam substrate, the resin is preferably first dissolved to a somewhat liquid state for facilitating the mixing with the colloidal graphite. After mixing the dissolved resin and the colloidal graphite filler material, the resulting coating mixture is preferably applied to the carbon foam by spraying with a suitable spraying mechanism, e.g., an air operated spray gun. However, if weight gain is not of a critical nature the coating mixture may be applied by a brush. The viscosity of the coating mixture may be selectively varied for rendering it most appropriate for the particular type of application desired. The viscosity of the mixture may be readily adjusted by adding selected quantities of solvent to the coating mixture. Satisfactory results with minimum weight increase in the article have been achieved by using about 70 to 80 weight percent solvent in the mixture and then spraying the mixture onto the selected surface portions of the carbon foam article. If applied by brushing a lesser quantity of solvent may be used. Solvents suitable for use with the aforementioned alkyd resins include relatively volatile solvents such as toluene, xylene, benzene, or aromatic naphtha.

After the coating mixture is applied on appropriate surfaces of the carbon foam, excess solvent is removed from the coating mixture by a "drying" operation which may be practiced by using a radiant heating system for a duration of about 20 minutes. After removing the excess solvent the resin may be carbonized by placing the carbon foam with the coating mixture thereon in a suitable furnace and, under the influence of an inert atmosphere, e.g., argon, helium, or nitrogen, heating the coated assembly to a temperature in the range of about 800°–1000° C. The duration of this heating step is preferably about 24 hours or longer to assure complete carbonization of the resin.

The properties and characteristics of the improved carbonaceous coating of the present invention provide features whereby carbon foam usage may be considerably enhanced. The coating, which is a glasslike or vitreous form of carbon, is very adherent with the carbon foam matrix and strengthens the individual cell walls exposed at the surface of the carbon foam article. These advantages are realized before the porosity of the coated surface becomes obliterated and a dimensional buildup starts. Thus, with the improved coating of this invention a substantial increase in the compressive strength and resistance to abrasion can be achieved without altering the dimensions of the carbon foam article.

In order to provide a clearer understanding of the present invention examples relating to typical applications of the carbonaceous coating on carbon foam articles are set forth below.

EXAMPLE I

The carbonaceous coating was provided on exposed surfaces of a carbon foam article having a density of 0.05 gram per cubic centimeter by employing the steps of preparing a coating mixture of 67.5 grams of colloidal graphite blended into 202.5 grams of polyethylene orthophthalate dissolved in 630 grams of xylene, air spraying the coating mixture onto the exposed surfaces of the carbon foam article, drying the coated article under radiant heat for 20 minutes for removing excess xylene, and then carbonizing the coating at 800° C. in a nitrogen atmosphere. During the carbonizing step the temperature was increased to 800° C. over a 24-hour period and then maintained at this temperature for 2 hours. Analysis of the coated foam indicated a weight gain of 4 grams over the weight of the uncoated carbon foam, essentially no dimensional change, and an average compressive yield strength of 40 p.s.i. On the other hand, a carbon foam article of similar density and configuration provided with the aforementioned patented coating showed an average weight gain of 12 grams and an average compressive yield strength of only 8 p.s.i.

EXAMPLE II

A carbon foam article having a density of 0.22 gram per cubic centimeter was provided with a protective coating by using a coating mixture and method steps similar to those set forth in Example I. Analysis of the coated-carbon foam article indicated an average compressive yield strength of 1200 p.s.i., essentially no dimensional change, and a weight gain of 3 grams over the weight of the uncoated article. These data demonstrated superiority over carbon foam articles of similar density and configuration that have been coated with the aforementioned patented coating in that the weight gain with the latter averaged about 7 grams while the average compressive yield strength was 700 p.s.i.

It will be seen that the carbonaceous coating of the present invention provides a substantial improvement over the previously known carbonaceous coatings for carbon foams, particularly with respect to weight increases in the coated article and compressive strengths.

What is claimed is:

1. A method of providing a cellular structure consisting essentially of carbon with an abrasion-resistant protective carbonaceous coating, comprising the steps of applying to selected surface portions of the cellular structure a coating mixture of a thermosetting alkyd resin selected from the group consisting of polyethylene orthophthalate, polyethylene terephthalate, and polypropylene orthophthalate dissolved in a solvent therefor and colloidal graphite, removing excess solvent from the coating mixture, and thereafter heating the coated assembly in an inert atmosphere to a temperature sufficient to carbonize the thermosetting resin and thereby form the protective carbonaceous coating, said coating characterized by its tenacious adherence with the underlying cellular structure and the strengthening of the individual cell walls of the latter exposed at the surface thereof and contacted by the coating mixture.

2. The method claimed in claim 1, wherein the thermosetting alkyd resin is polyethylene orthophthalate and provides about 14 to 22.5 weight percent of the mixture, the colloidal graphite is in a size range of about 1 to 500 millimicrons and provides about 7.5 to 16.0 weight percent of the mixture, and wherein said solvent provides the remaining weight percent of the mixture.

References Cited

UNITED STATES PATENTS 3,558,344 1/1971 Peterson _____ 117—46 CC
3,197,527 7/1965 Krummeich _____ 264—29

WILLIAM D. MARTIN, Primary Examiner

J. A. BELL, Assistant Examiner

U.S. Cl. X.R.

117—46 CC, 98, 226; 264—29